H. A. STEARNS.
Reciprocating Churn-Dasher.

No. 166,231. Patented Aug. 3, 1875.

Witnesses
J. A. Miller jr.
W. C. King

Henry A. Stearns
Inventor
by Joseph A. Miller
Attorney

UNITED STATES PATENT OFFICE.

HENRY A. STEARNS, OF LINCOLN, RHODE ISLAND.

IMPROVEMENT IN RECIPROCATING CHURN-DASHERS.

Specification forming part of Letters Patent No. 166,231, dated August 3, 1875; application filed July 10, 1875.

*To all whom it may concern:*

Be it known that I, HENRY A. STEARNS, of Lincoln, in the county of Providence, State of Rhode Island, have invented certain new and useful Improvements in Churn-Dashers; and I do hereby declare that the following is a full, clear, and exact description thereof, reference being had to the accompanying drawings, forming part of this specification.

Figure 1:
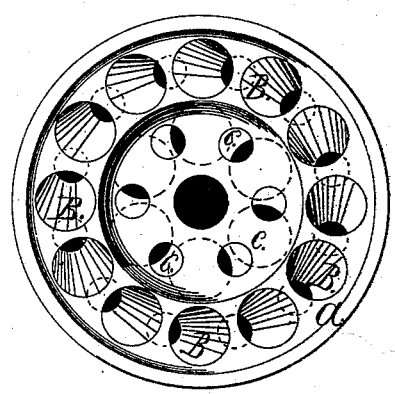
Figure 2:
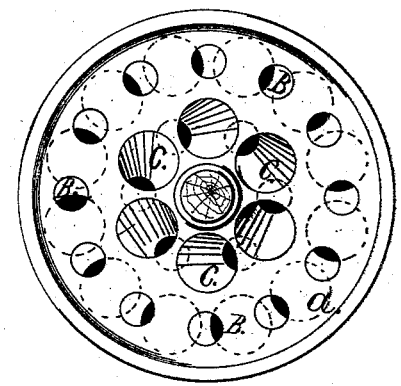
Figure 3:
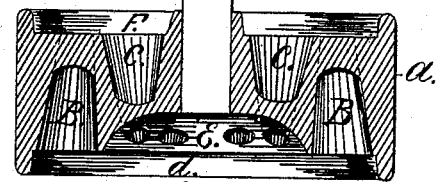

Figure 1 is a view of the bottom of the churn-dasher. Fig. 2 is a view of the top of the same. Fig. 3 is a sectional view through the center of the same.

In the drawings, $a$ is a circular disk of wood or other suitable material. B B are conical holes placed near the circumference of the disk. These holes have a greater diameter at the bottom than at the top, and these conical holes B B are preferably placed at an angle less than that of a right angle with the face of the disk. They may, however, be placed at a right angle with the face of the disk, or on a line with the axis of the disk. C C are conical holes placed within the circle formed by the holes B B. These holes are the reverse of the holes B B—that is, of larger diameter at their upper end, and decreasing downward. These holes are also preferably made with their axes at an angle less than a right angle with the face of the disk $a$. $d$ is a recess in the under side of the churn-dasher, and E is a cavity into which the small ends of the holes C C open. F is a recess in the upper face of the disk $a$, and $g$ is the handle, of suitable length, to which the disk is secured, and by which the dasher is operated.

The holes B and C are shown in Figs. 1 and 2 in solid lines, the broken lines indicating the position and diameter of the holes on the opposite face of the disk.

The object of the invention is to facilitate the formation of butter by thoroughly breaking up and churning the milk, and by drawing air into, and forcing the same through, the milk.

The operation of this churn-dasher is as follows: When placed in a churn and forced downward, the milk is forced upward through the conical holes B B, and the fatty globules, by the friction against the sides of the conical holes, are broken, and the milk is forced in small streams from the upper and smaller ends of the conical holes B B, and when the dasher is raised a portion of the milk descends through the holes C C, and a portion through the holes B B, but the larger portion passes on the outside of the dasher, drawing down air with it. This air is retained by the recess $d$ and the cavity E under the dasher, and is forced with the milk through the holes B B, thus producing a complete circulation of air through the milk, and a thorough churning of the same.

The object of inclining the axes of the conical holes at an angle, as shown in the drawings, is to produce a more complete rotation of, and churning action on, the milk, and also to prevent the jets of milk which leave the small ends of the holes at a considerable velocity from being forced out of the churn or above the surface of the milk during the churning.

When the butter-particles collect and form butter, the peculiar arrangement of the conical holes B B greatly facilitates the formation, as the milk can pass through the small end of the holes, while the butter is held below in the recess $d$ and cavity E, the dasher being moved slower at this state of the churning, to enable the butter-particles to collect and form into lumps.

This churn-dasher is simple in construction, it is readily cleaned—an important advantage in a churn-dasher, which is much facilitated by the conical shape of the holes—and so efficient that milk can be thoroughly churned and butter formed in much less time and with less labor than with other churn-dashers.

Having thus described my invention, I claim as new and desire to secure by Letters Patent—

A churn-dasher having conical inclined holes B, circularly arranged with the larger ends below, opening into recess $d$, and small ends above into recess F, and similar holes C, interiorly arranged, with smaller ends opening into the cavity E, and large ends opening into recess F', all constructed substantially as and for the purpose described.

HENRY A. STEARNS.

Witnesses:
JOSEPH A. MILLER,
C. E. LAPHAM.